(12) United States Patent
Welch

(10) Patent No.: US 12,524,506 B2
(45) Date of Patent: Jan. 13, 2026

(54) GRAPHICAL USER INTERFACE FOR GENERATING TOKENIZED DIGITAL DATA

(71) Applicant: Kelly Welch, Boerne, TX (US)

(72) Inventor: Kelly Welch, Boerne, TX (US)

( * ) Notice: Subject to any disclaimer, the term of this patent is extended or adjusted under 35 U.S.C. 154(b) by 128 days.

(21) Appl. No.: 18/144,117

(22) Filed: May 5, 2023

(65) Prior Publication Data

US 2023/0359710 A1   Nov. 9, 2023

Related U.S. Application Data

(60) Provisional application No. 63/338,702, filed on May 5, 2022.

(51) Int. Cl.
*G06F 21/10* (2013.01)
*G06F 3/0484* (2022.01)
*G06F 9/451* (2018.01)
*G06F 16/23* (2019.01)
*G06F 21/60* (2013.01)

(52) U.S. Cl.
CPC ............ *G06F 21/10* (2013.01); *G06F 3/0484* (2013.01); *G06F 9/451* (2018.02); *G06F 16/2379* (2019.01); *G06F 21/602* (2013.01); *G06F 21/1014* (2023.08)

(58) Field of Classification Search
CPC ........ G06F 21/10; G06F 3/0484; G06F 9/451; G06F 16/2379; G06F 21/602; G06F 21/1014; H04L 2209/56; H04L 9/50
See application file for complete search history.

(56) References Cited

U.S. PATENT DOCUMENTS

| | | | | |
|---|---|---|---|---|
| 11,244,032 B1* | 2/2022 | Nguyen | .................. | G06F 9/547 |
| 11,367,060 B1* | 6/2022 | Barbashin | .......... | H04N 21/2743 |
| 12,003,622 B1* | 6/2024 | Anderson | ............... | H04L 9/085 |
| 2022/0366022 A1* | 11/2022 | Goldston | ................ | G06F 16/61 |
| 2023/0120476 A1* | 4/2023 | Baskin | ............... | G06Q 20/3672 |
| | | | | 705/66 |

* cited by examiner

*Primary Examiner* — Nicholas R Taylor
*Assistant Examiner* — Tania M Pena-Santana
(74) *Attorney, Agent, or Firm* — Outlier Patent Attorneys, PLLC

(57) ABSTRACT

An example method may comprise providing a first graphical user interface for receiving first image data, a second graphical user interface for receiving first audio data, a third graphical user interface for receiving first video data, a fourth graphical user interface for receiving a first attribute input, and a fifth graphical user interface for receiving a second attribute input. The example method may comprise generating a digital file based on the first image data, the first audio data, first video data, digital data associated with the first attribute input, and digital data associated with the second attribute input. The example method may comprise tokenizing the generated digital file to generate a non-fungible token (NFT) associated with the digital file. The example method may comprise encoding the NFT with metadata. The example method may comprise generating a sixth graphical user interface enabling updates to the metadata associated with the NFT.

18 Claims, 9 Drawing Sheets

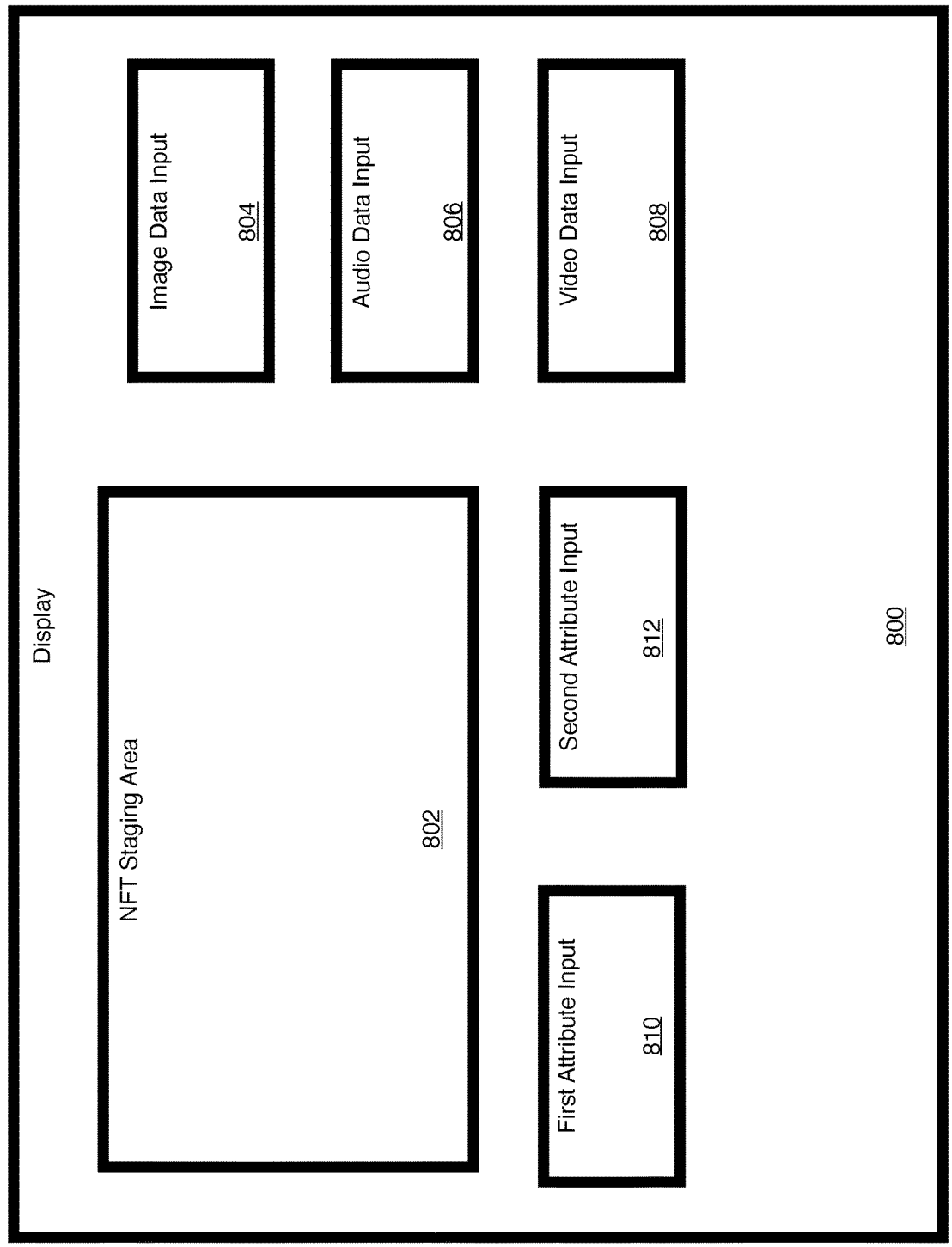

GRAPHICAL USER INTERFACE FOR GENERATING TOKENIZED DIGITAL DATA

CROSS-REFERENCE TO RELATED APPLICATIONS

This application claims priority to Provisional Patent Application 63/338,702, titled "Platform for Creating Customized Digital Assets, and filed on May 5, 2022, which is incorporated by reference in its entirety.

BACKGROUND

Field of the Art

The systems and methods disclosed herein are related generally to digital assets and more specifically to facilitating the creation and transfer of customized digital assets.

Discussion of the State of the Art

Digital assets, such as cryptocurrencies, are increasingly becoming part of the global economy. Most coins of a particular type are indistinguishable from other coins of the particular type. For example, one Bitcoin in a first wallet generally has the same value as one Bitcoin in a second wallet. However, non-fungible tokens (NFTs) are unique digital assets. An NFT may comprise or be associated with a digital file, such as an image file, an audio file, a video file, etc. The NFT may convey ownership, such as copyright ownership, over data represented by the digital file. Currently, creating an NFT is difficult for a lay person. What is needed is a platform to facilitate creation, purchases, marketing, and management of NFTs.

The ability to generate custom NFTs has gained popularity, however the customization process can be challenging. The process is often a manual, iterative process where a first customization is applied followed by a subsequent customization layered on top of the previous one and so on. Ultimately, the end product is not apparent until all iterations are complete. This makes it difficult to make modifications to the custom NFT throughout the process with an understanding of how each modification will affect the end product as subsequent layers of modification have not yet been applied.

SUMMARY

The present invention provides one solution to the above identified problem. In one embodiment, this is provided in the form of a user interface(s) which allow for the combination of a plurality of modifications or customizations to a digital file to be applied in real-time and viewed in combination in real-time. The exemplary user interface(s) allow for a plurality of customization inputs to be blended or combined together to generate a unique customized digital file which can be converted into an NFT. By being able to see the resulting customization in real-time, a user is able to see the effects of each modification on the final product as opposed to having to go through each modification one at a time until each modification has been completed before being able to see what the finished product will look like. This may be accomplished through the application of artificial intelligence (AI) to generate a custom digital file that simultaneously incorporates each of the custom modifications provided or indicated by a user through a graphical user interface. The AI may apply a set of rules to combine a plurality of customizations (e.g. image data, audio data, video data, physical and/or non-physical attributes, etc.) together into a custom digital file.

The present invention is for systems and methods for generating a digital file that is tokenized as a non-fungible token for storage on a distributed ledger system. An example computer implemented system may comprise a first graphical user interface for receiving first image data. The example computer implemented system may comprise a second graphical user interface for receiving first audio data. The example computer implemented system may comprise a third graphical user interface for receiving first video data. The example computer implemented system may comprise a fourth graphical user interface for receiving a first attribute input, the first attribute input corresponding to at least one of image data, audio data, and video data. The example computer implemented system may comprise a fifth graphical user interface for receiving a second attribute input, the second attribute input corresponding to at least one of image data, audio data, and video data. The example computer implemented system may comprise a digital file generated based on the first image data, the first audio data, first video data, digital data associated with the first attribute input, and digital data associated with the second attribute input. The example computer implemented system may comprise a non-fungible token (NFT) associated with the digital file generated by a tokenization process. The example computer implemented system may comprise metadata comprising at least content in the generated digital file and a description of the content in the generated digital file. The example computer implemented system may comprise a sixth graphical user interface enabling a first user to update the metadata associated with the NFT.

The tokenization process may generate the digital file by storing a unit of data associated with the digital file on a distributed ledger system.

The NFT may be encoded with the metadata.

The metadata may be pointed to by a cryptographically uniform resource identifier that is referenced by the NFT.

The first user may be a creator of the digital file.

The first user may be enabled, via the sixth graphical user interface, to update the metadata regardless of whether the first user is the owner of the NFT.

At least one of the first image data, the first audio data, and the first video data may be created by artificial intelligence (AI).

At least two of the first image data, the first audio data, and the first video data may be created by artificial intelligence (AI).

The present invention is for systems and methods for generating a digital file. An example computer implemented method may comprise providing a first graphical user interface for receiving first image data. The example computer implemented method may comprise providing a second graphical user interface for receiving first audio data. The example computer implemented method may comprise providing a third graphical user interface for receiving first video data. The example computer implemented method may comprise providing a fourth graphical user interface for receiving a first attribute input, the first attribute input corresponding to at least one of image data, audio data, and video data. The example computer implemented method may comprise providing a fifth graphical user interface for receiving a second attribute input, the second attribute input corresponding to at least one of image data, audio data, and video data. The example computer implemented method may comprise generating a digital file based on the first image data, the first audio data, first video data, digital data associated with the first attribute input, and digital data associated with the second attribute input. The example computer implemented method may comprise tokenizing the generated digital file by storing a unit of data associated with the digital file on a distributed ledger system. The tokenization process may generate a non-fungible token (NFT) associated with the digital file. The example computer implemented method may comprise encoding the NFT with metadata. The example computer implemented method may comprise generating a sixth graphical user interface enabling a first user to update the metadata associated with the NFT.

The metadata may comprise at least content in the generated digital file and a description of the content in the generated digital file.

The metadata may be pointed to by a cryptographically uniform resource identifier that is referenced by the NFT.

The first user may be a creator of the digital file.

The first user may be enabled, via the sixth graphical user interface, to update the metadata regardless of whether the first user is the owner of the NFT.

At least one of the first image data, the first audio data, and the first video data may be created by artificial intelligence (AI).

At least two of the first image data, the first audio data, and the first video data may be created by artificial intelligence (AI).

The present invention is for systems and methods comprising computer readable medium for facilitating the creation and transfer of customized digital assets. An example computer readable medium may comprise instructions that when executed by a processor enable the processor to provide a first graphical user interface for receiving first image data. The example computer readable medium may comprise instructions that when executed by a processor enable the processor to provide a second graphical user interface for receiving first audio data. The example computer readable medium may comprise instructions that when executed by a processor enable the processor to provide a third graphical user interface for receiving first video data. The example computer readable medium may comprise instructions that when executed by a processor enable the processor to provide a fourth graphical user interface for receiving a first attribute input, the first attribute input corresponding to at least one of image data, audio data, and video data. The example computer readable medium may comprise instructions that when executed by a processor enable the processor to provide a fifth graphical user interface for receiving a second attribute input, the second attribute input corresponding to at least one of image data, audio data, and video data. The example computer readable medium may comprise instructions that when executed by a processor enable the processor to generate a digital file based on the first image data, the first audio data, first video data, digital data associated with the first attribute input, and digital data associated with the second attribute input. The example computer readable medium may comprise instructions that when executed by a processor enable the processor to tokenize the generated digital file by storing a unit of data associated with the digital file on a distributed ledger system. The tokenization process may generate a non-fungible token (NFT) associated with the digital file. The example computer readable medium may comprise instructions that when executed by a processor enable the processor to encode the NFT with metadata. The example computer readable medium may comprise instructions that when executed by a processor enable the processor to generate a sixth graphical user interface enabling a first user to update the metadata associated with the NFT.

The metadata may comprise at least content in the generated digital file and a description of the content in the generated digital file.

The metadata may be pointed to by a cryptographically uniform resource identifier that is referenced by the NFT.

At least one of the first image data, the first audio data, and the first video data may be created by artificial intelligence (AI).

At least two of the first image data, the first audio data, and the first video data may be created by artificial intelligence (AI).

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 8 illustrates an example display with example graphical user interfaces in accordance with an exemplary embodiment of the invention.

DETAILED DESCRIPTION

Figure 1:
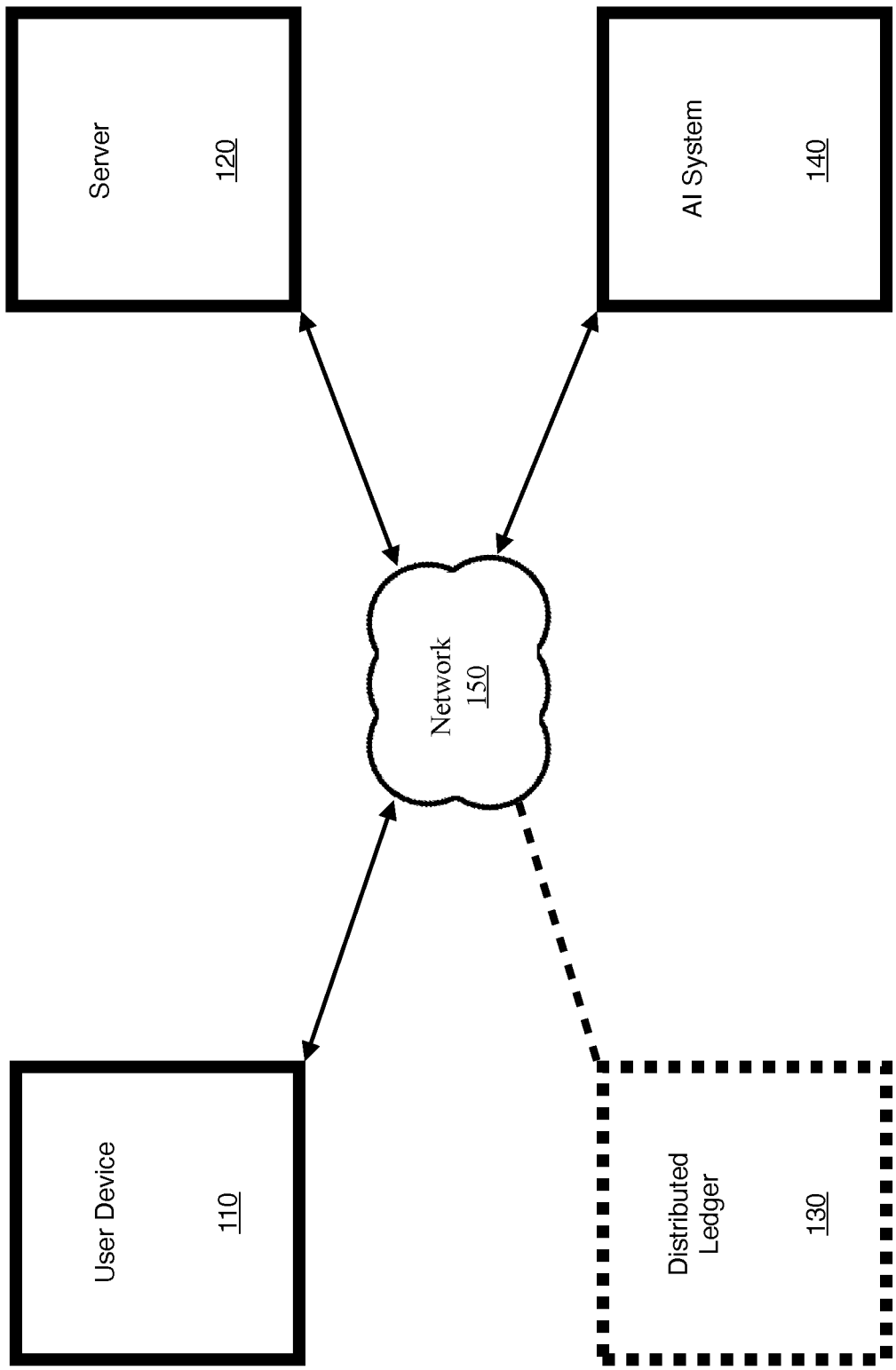
FIG. 1 illustrates a system for facilitating the creation and transfer of customized digital assets in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1 illustrates a system for facilitating the creation and transfer of customized digital assets in accordance with an exemplary embodiment of the invention. The system comprises a user device 110, a server 120, a distributed ledger 130, an artificial intelligence (AI) system 140, and a network 150. A user may use the user device 110 to access the server 120 via the network 150 to create a non-fungible token (NFT). NFTs created by the server 120 may be tracked (e.g., accounted for, etc.) on the distributed ledger 130. The server 120 may use the AI system 140 to create the NFT.

The user device 110 may comprise and/or be in contact with the distributed ledger 130. The user device 110 may comprise a wallet (e.g. a digital wallet, crypto wallet, etc.). The wallet may be associated with one or more transactions recorded in the distributed ledger 130.

The user device 110 may comprise a browser for accessing a web application hosted on the server 120. The user device 110 may comprise an application for interacting with a web application hosted on the server 120. The user device 110 may comprise an application obtained from the server 120.

The user device 110 (herein referred to as user input device, computing device, or client device) may include, generally, a computer or computing device including functionality for communicating (e.g., remotely) over the network 150. The user device 110 may be a server, a desktop computer, a laptop computer, personal digital assistant (PDA), an in- or out-of-car navigation system, a smartphone or other cellular or mobile phone, or mobile gaming device, among other suitable computing devices. The user device 110 may execute one or more client applications, such as a web browser (e.g., Microsoft Windows Internet Explorer, Mozilla Firefox, Apple Safari, Google Chrome, and Opera, etc.), or a dedicated application for photo capturing and transmission.

In particular embodiments, the user device 110 may be an electronic device including hardware, software, or embedded logic components or a combination of two or more such components and capable of carrying out the appropriate functions implemented or supported by the user device 110. For example and without limitation, the user device 110 may be a desktop computer system, a notebook computer system, a netbook computer system, a handheld electronic device, or a mobile telephone. The present disclosure contemplates any user device as the user device 110. The user device 110 may enable a network user to access network 150. The user device 110 may communicate with other computing devices.

The user device 110 may have a web browser, such as MICROSOFT INTERNET EXPLORER, GOOGLE CHROME, APPLE SAFARI, OPERA, or MOZILLA FIREFOX, and may have one or more add-ons, plug-ins, or other extensions, such as TOOLBAR or YAHOO TOOLBAR. The user device 110 may enable a user to enter a Uniform Resource Locator (URL) or other address directing the web browser to a server, such as the server 120, and the web browser may generate a Hyper Text Transfer Protocol (HTTP) request and communicate the HTTP request to the server. The server may accept the HTTP request and communicate to the user device 110 one or more Hyper Text Markup Language (HTML) files responsive to the HTTP request. The user device 110 may render a web page based on the HTML files from the server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

This disclosure contemplates any suitable number of client devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system(s) may perform at different times or at different locations one or more steps of one or more methods described or illustrated herein, where appropriate.

Although only one user device, user device 110, is shown, the server 120 may interact with any number of user devices.

The server 120 may comprise an address, such as an Internet Protocol (IP) address or a Uniform Resource Locator (URL), associated with a non-fungible token (NFT) creation and/or transaction platform. The server 120 may comprise one or more computing device(s). The server 120 may comprise a cloud computing environment. The server 120 may comprise a distributed computing environment. The server 120 may host a website. The server 120 may host a web application. The server 120 may provide applications, such as mobile applications, for download by the user device 110 via the network 150. The server 120 may receive communications from and transmit communications to the user device 110 via the network 150. The server 120 will be described in greater detail in reference to FIG. 2.

The distributed ledger 130 may comprise multiple computing devices executing software configured to track, verify, authenticate, etc. transactions associated with one or more coins and/or tokens. The distributed ledger 130 may comprise multiple computing devices executing software configured to track, verify, authenticate, etc. coins and/or tokens associated with particular wallets. The distributed ledger 130 may comprise non-fungible tokens (NFTs). The distributed ledger 130 may be immutable. Although only one distributed ledger, distributed ledger 130, is shown, the server 120 may interact with any number of distributed ledgers.

The artificial intelligence (AI) system 140 may predict a desired response based on a prompt. The AI system 140 may comprise a large language model (LLM) system. The artificial intelligence (AI) system 140 may be trained on a large data set. The AI system 140 may return text based on a prompt. The AI system 140 may return image data based on a prompt. The AI system 140 may return audio data based on a prompt. The AI system 140 may return video data based on a prompt. Although only one AI system, AI system 140, is shown, the server 120 may interact with any number of AI systems. The AI system 140 may apply a set of rules to combine a plurality of customizations received from the user device (e.g. image data, audio data, video data, physical and/or non-physical attributes, etc.) together into a custom digital file.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Server for Creating Custom Digital Assets

Figure 2:
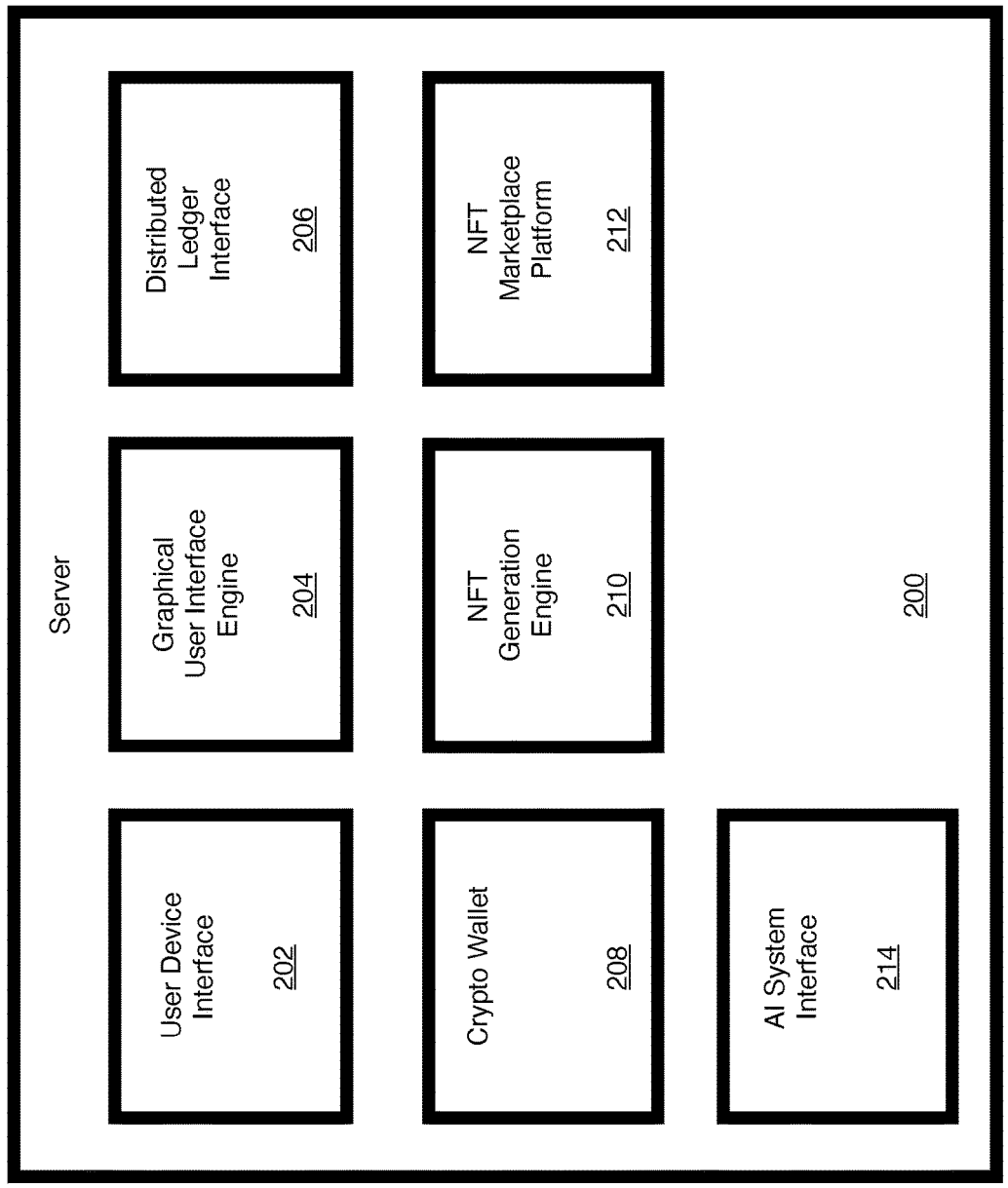
FIG. 2 illustrates an example server in accordance with an exemplary embodiment of the present invention.

FIG. 2 illustrates an example computing environment in accordance with an exemplary embodiment of the present invention. The computing environment may comprise a server 200, such as the server 120 in FIG. 1. The server 200 may comprise a user device interface 202, a graphical user interface (GUI) engine 204, a distributed ledger interface 206, a crypto wallet 208, a non-fungible token (NFT) generation engine 210, an NFT marketplace platform 212, and an artificial intelligence (AI) system interface 214.

The user device interface 202 may receive information (e.g., data, etc.) from the other modules of the server 200 and prepare one or more signals indicative of the information for transmission across the network 150 in FIG. 1 and for consumption by user device 110 in FIG. 1. The user device interface 202 may receive signals indicative of information from the network 150 originating from the user device 110 and prepare one or more signals indicative of the information for consumption by other modules of the server 200. The user device interface 202 may receive a request, such as a Hypertext Transfer Protocol (HTTP) request, Application Programming Interface (API) request, etc., from the user device and provide a response, such as an HTTP response, an API response, etc.

The GUI engine 204 may prepare information that will be transmitted to the user device 110 and used by the user device 110 to render a screen on an associated display. The GUI engine 204 may determine appropriate input modules to be displayed on the rendered screen. The GUI engine 204 may handle interactions with input modules, such as causing files to be received and/or stored appropriately, causing pixels in image and/or video data to be altered in an appropriate manner, causing audio pitch to be altered in an appropriate manner, etc.

The distributed ledger interface 206 may receive information (e.g., data, etc.) from the other modules of the server 200 and prepare one or more signals indicative of the information for transmission across the network 150 in FIG. 1 and for consumption by one or more computing devices executing software to run the distributed ledger 130 in FIG. 1. The user device interface 202 may receive signals indicative of information from the network 150 originating from one or more computing devices executing software to run the distributed ledger 130 and prepare one or more signals indicative of the information for consumption by other modules of the server 200. In some instances, the distributed ledger interface 206 may confirm a wallet purporting to have coins and/or tokens, such as an amount of a coin, an amount of a token, or a particular NFT, actually has purported coins and/or tokens. The distributed ledger interface 206 may initiate transactions on the distributed ledger 130.

The crypto wallet 208 may comprise or be capable of comprising coins and/or tokens associated with the distributed ledger 130 in FIG. 1. The crypto wallet 208 may hold coins and/or tokens associated with an exchange, such as an exchange hosted by the NFT marketplace platform 212.

The NFT generation engine 210 may cause an NFT associated with the distributed ledger 130 in FIG. 1 to be created (e.g., made, generated, minted, etc.). The NFT generation engine 210 may create an NFT associated with digital data and/or metadata as altered based on engagement of input modules provided by the GUI engine 204.

The NFT marketplace platform 212 may facilitate the buying, selling, marketing, transfer, exchange, etc. of NFTs. The NFTs may be tokens associated with the distributed ledger 130 in FIG. 1. The NFTs available for purchase may be presented with an asking price. The asking price may be in a coin and/or token associated with the distributed ledger. On execution of a deposit, the NFT marketplace platform 212 may credit an account associated with the deposit with an NFT, an amount of coins, and/or an amount of tokens on confirmation that the deposit is in the crypto wallet 208. On execution of a trade, the NFT marketplace platform 212 may transfer ownership of an NFT from an account associated with a first party to an account associated with a second party and ownership of an amount of coins and/or tokens from the account associated with the second party to the account associated with the first party. On execution of a withdrawal, the NFT marketplace platform 212 may cause NFTs and/or coins and/or tokens in the crypto wallet 208 to be transferred to a wallet associated with another party.

The AI system interface 214 may receive information (e.g., data, etc.) from the other modules of the server 200 and prepare one or more signals indicative of the information for transmission across the network 150 in FIG. 1 and for consumption by AI system 140 in FIG. 1. The AI system interface 214 may receive signals indicative of information from the network 150 originating from the AI system 140 and prepare one or more signals indicative of the information for consumption by other modules of the server 200. The AI system interface 214 may cause a prompt to be transmitted to the AI system 140 and receive a response to the prompt. The AI system interface 214 may receive at least one of image data, audio data, video data, physical attributes and non-physical attributes for use by an AI algorithm in combining the data together into a custom digital file.

Process for Creating Custom Digital Assets

Figure 3A:
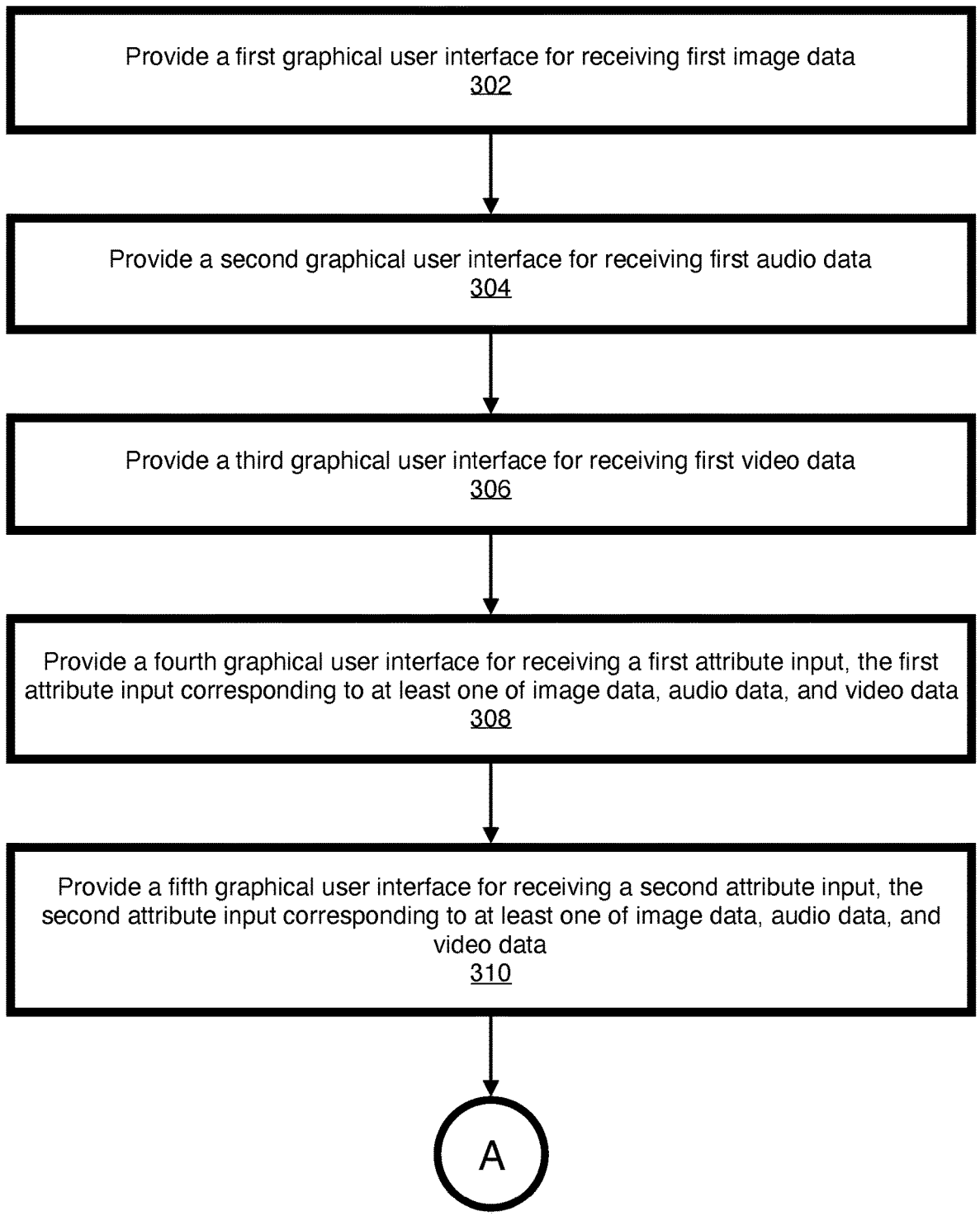
FIGS. 3A-3B illustrate a flow diagram in accordance with an example method for facilitating the creation and transfer of customized digital assets in accordance with an exemplary embodiment of the invention.
Figure 3B:
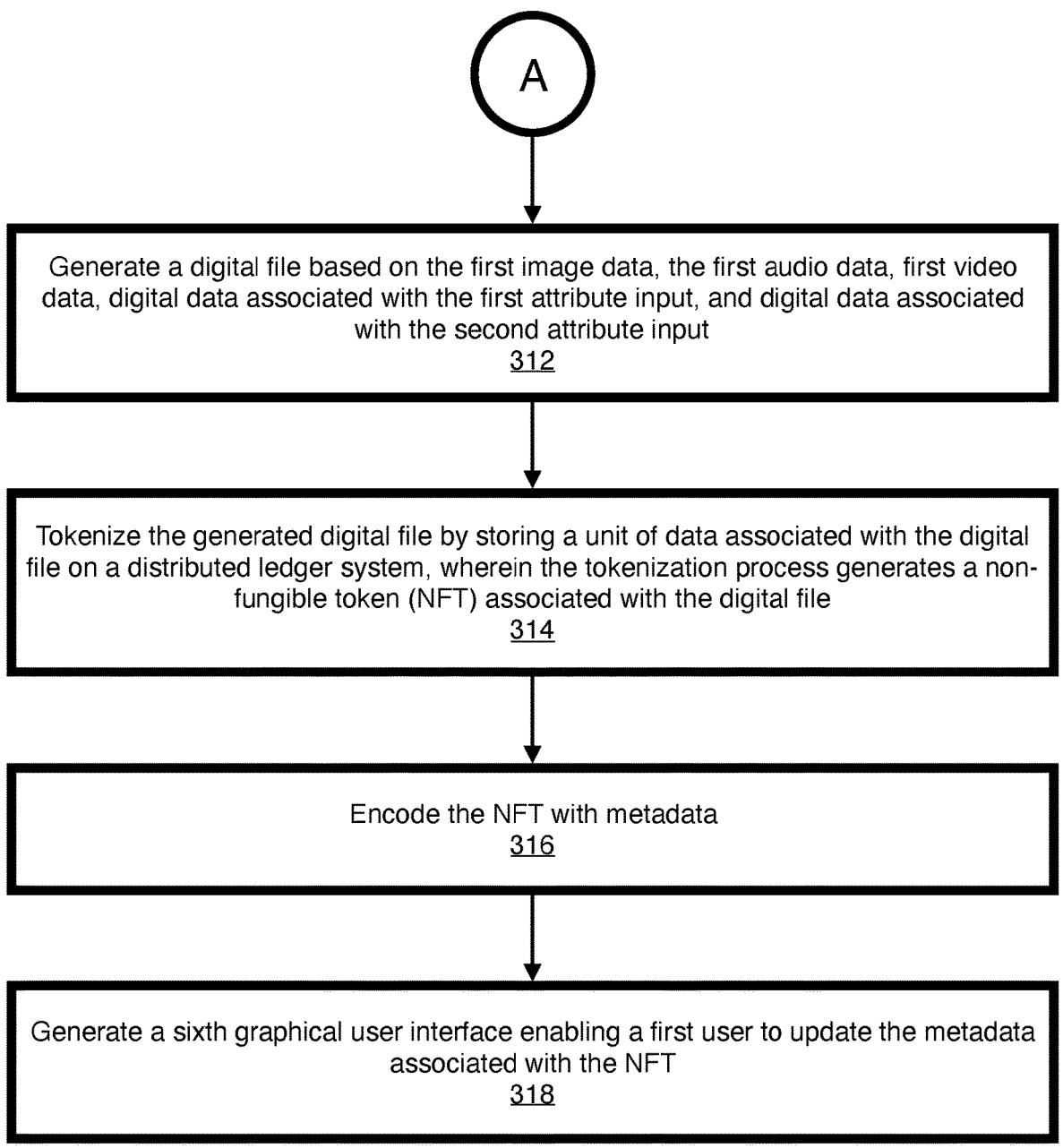

FIGS. 3A-3B illustrate a flow diagram in accordance with an example method for facilitating the creation and transfer of customized digital assets in accordance with an exemplary embodiment of the invention. In embodiments, the method steps or techniques depicted and described herein can be performed in a processor of the server 120 in FIG. 1, the method steps being encoded as processor-executable instructions in a non-transitory memory of the server 120. The techniques of FIG. 3 may be implemented in an operating system kernel, in a separate user process, in a library package bound into network applications, on a specially constructed machine, on an application-specific integrated circuit (ASIC), or a field programmable gate array (FPGA). The process may comprise additional steps, fewer steps, and/or a different order of steps without departing from the scope of the invention as would be apparent to one of ordinary skill in the art.

Turning first to FIG. 3A, at step 302, a first graphical user interface for receiving first image data may be provided. The first graphical user interface may receive an image file from a user device, such as the user device 110. The first graphical user interface may receive a location, such as a website location, from which the first graphical user interface may cause an image file to be pulled. The first graphical user interface may allow a user to take a screenshot. The first graphical user interface may allow a user to take a picture from a webcam.

At step 304, a second graphical user interface for receiving first audio data may be provided. The second graphical user interface may receive an audio file from a user device, such as the user device 110. The second graphical user interface may receive a location, such as a website location, from which the second graphical user interface may cause an audio file to be pulled. The second graphical user interface may allow a user to capture audio played to a speaker. The second graphical user interface may allow a user to capture audio from a microphone.

At step 306, a third graphical user interface for receiving first video data may be provided. The third graphical user interface may receive a video file from a user device, such as the user device 110. The third graphical user interface may receive a location, such as a website location, from which the third graphical user interface may cause a video file to be pulled. The third graphical user interface may allow a user to take a video of a current screen of the user device 110. The third graphical user interface may allow a user to take video from a webcam.

At step 308, a fourth graphical user interface for receiving a first attribute input may be provided. The first attribute input may correspond to at least one of image data, audio data, and video data. The first attribute input may allow a user to alter one or more attributes associated with one or more of image data, audio data, and/or video data. For example, the first attribute input may alter pixels in image and/or video data, such as applying a filter to image and/or video data. As another example, the first attribute input may alter audio features of audio data, such as pitch, wavelength, amplitude, frequency, etc. The first attribute may comprise at least one physical attribute. Physical attributes may comprise an appearance of one or more elements or objects present in the image and/or video data, including but not limited to color, texture, size, shape, proportion, dimensions, etc. of image and or video element(s). The first attribute may comprise at least one non-physical attribute. For example, the image data may comprise image data associated with an individual, character, or the like, wherein the physical attributes comprise appearance characteristics of the individual, character, or the like. Non-physical attributes may comprise at least one of text, indicia, symbols, and the like present in the image and/or video data. Non-physical attributes may be associated with a characteristic, description, quality, feature, or the like associated with one or more elements or objects present in the image and/or video data. For example, non-physical attributes may comprise a display of a character or personality trait associated with a depicted individual or character, such as "brave", "courageous", etc. These examples are not intended to be limiting and non-physical attributes may comprise any number of different traits or non-trait based descriptors, words, phrases, symbols and/or other indicia.

At step 310, a fifth graphical user interface for receiving a second attribute input may be provided. The second attribute input may correspond to at least one of image data, audio data, and video data. The second attribute input may allow a user to alter one or more attributes associated with one or more of image data, audio data, and/or video data. For example, the second attribute input may alter pixels in image and/or video data, such as applying a filter to image and/or video data. As another example, the second attribute input may alter audio features of audio data, such as pitch, wavelength, amplitude, frequency, etc. The second attribute may comprise at least one physical attribute such as those described above in association with the first attribute. The second attribute may comprise at least one non-physical attribute such as those described above in association with the first attribute.

Turning now to FIG. 3B, at step 312, a digital file may be generated based on the first image data, the first audio data, first video data, digital data associated with the first attribute input, and digital data associated with the second attribute input.

At step 314, the generated digital file may be tokenized by storing a unit of data associated with the digital file on a distributed ledger system. The tokenization process may generate a non-fungible token (NFT) associated with the digital file.

At step 316, the NFT may be encoded with metadata. The metadata may comprise at least content in the generated digital file and a description of the content in the generated digital file. The metadata may be pointed to by a cryptographically uniform resource identifier that is referenced by the NFT.

At step 318, a sixth graphical user interface enabling a first user to update the metadata associated with the NFT may be generated. The first user may be a creator of the digital file. The first user may be enabled, via the sixth graphical user interface, to update the metadata regardless of whether the first user is the owner of the NFT. At least one of the first image data, the first audio data, and the first video data may be created by artificial intelligence (AI). At least two of the first image data, the first audio data, and the first video data may be created by artificial intelligence (AI).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the user device 110 in FIG. 1, the server 120 in FIG. 1, the distributed ledger 130 in FIG. 1, the artificial intelligence (AI) system 140 in FIG. 1, and the network 150 in FIG. 1, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
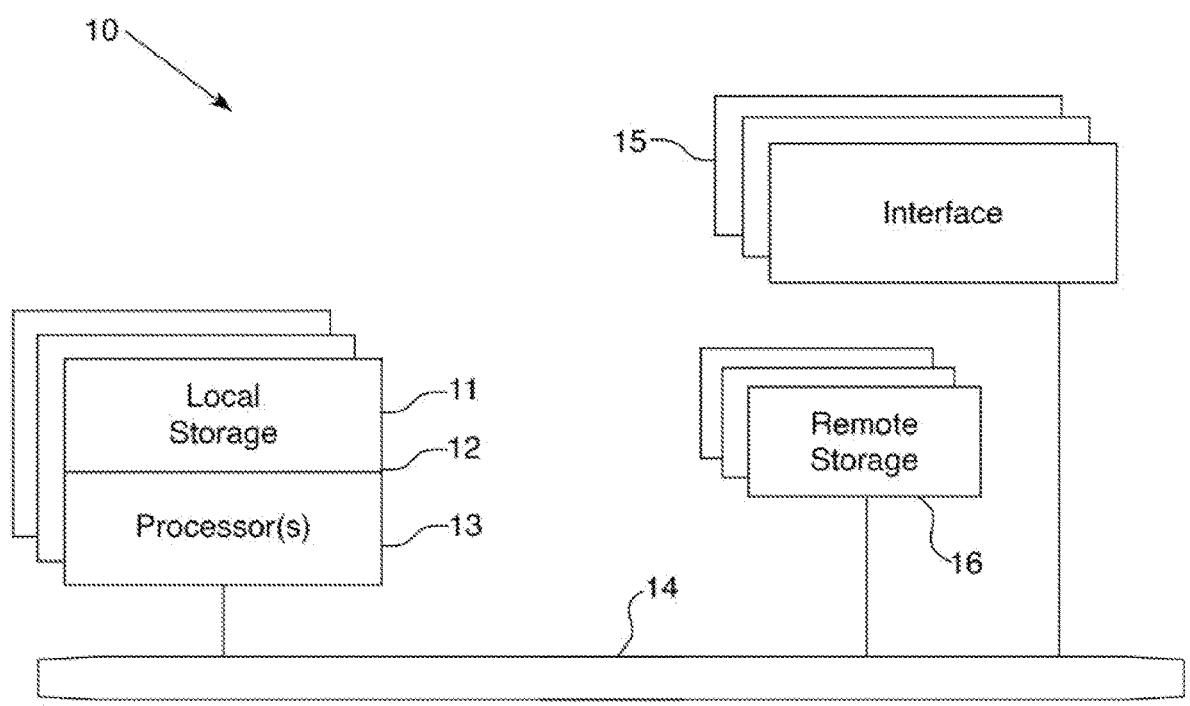
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
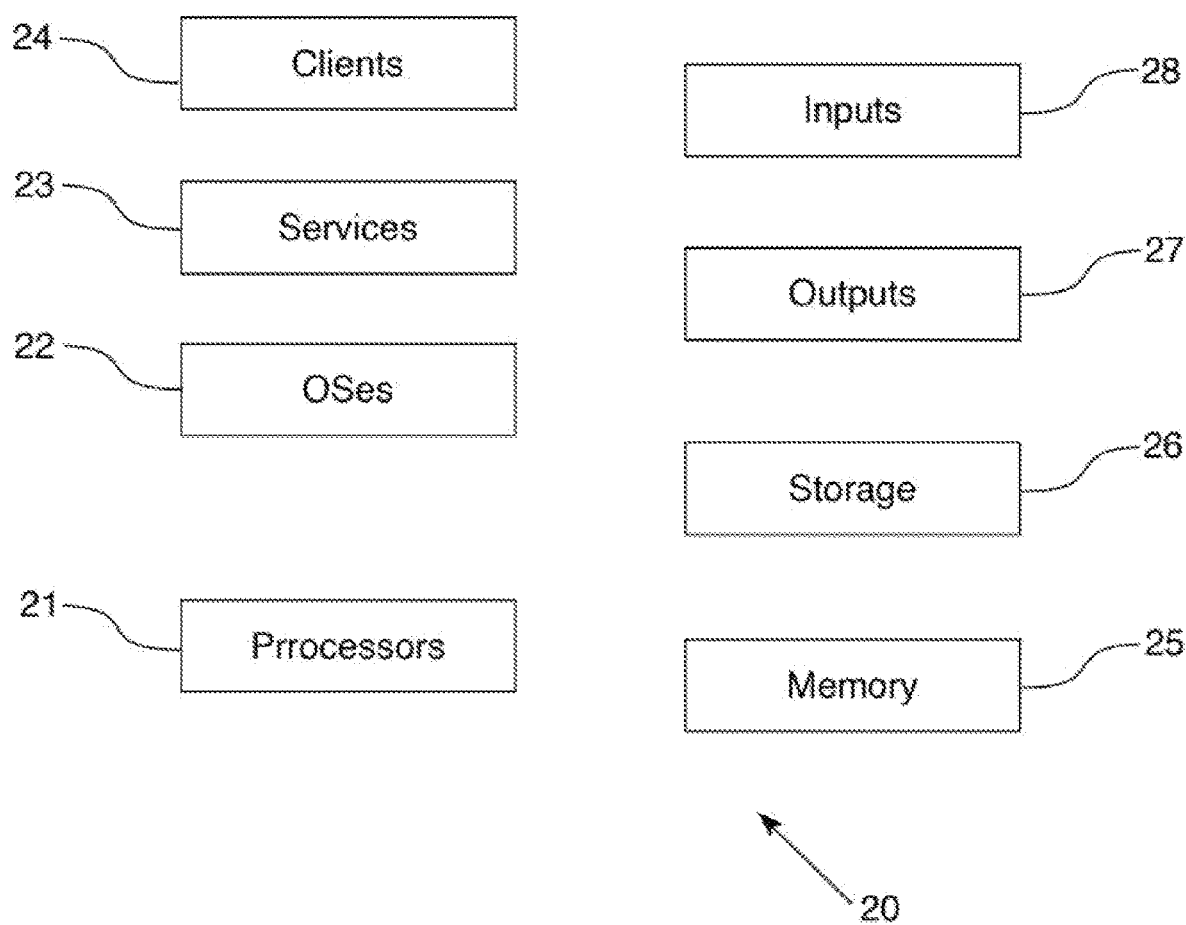
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
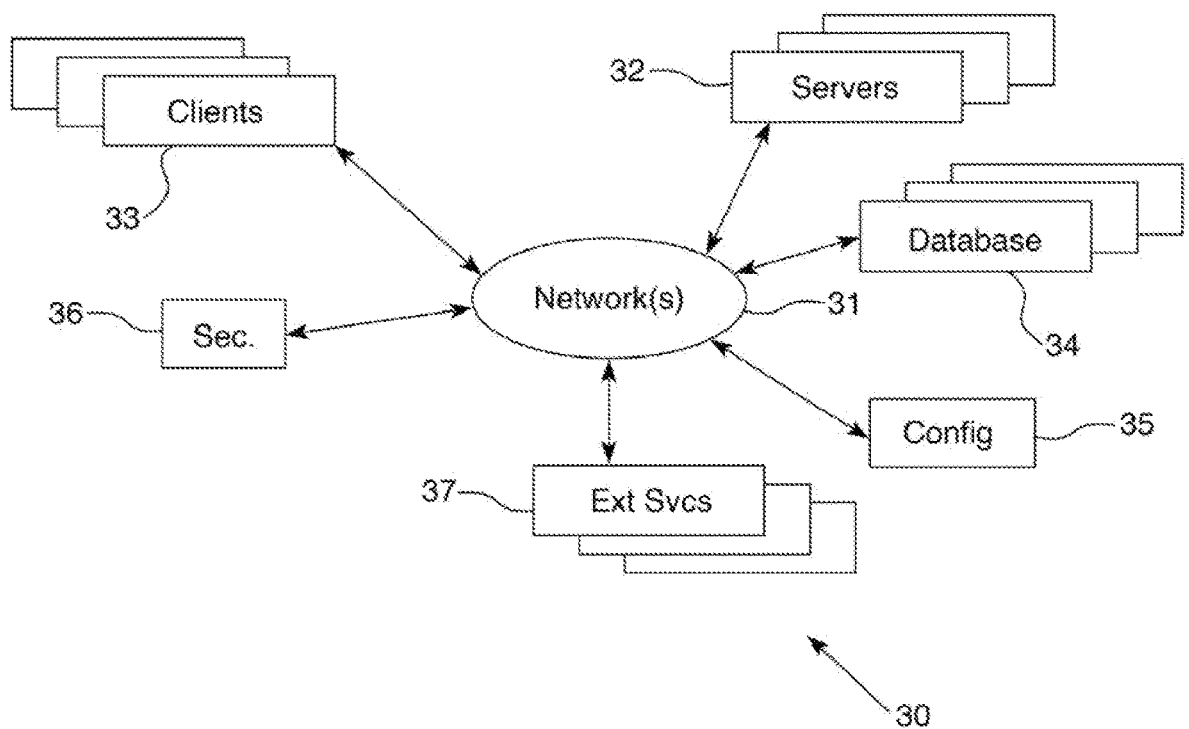
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
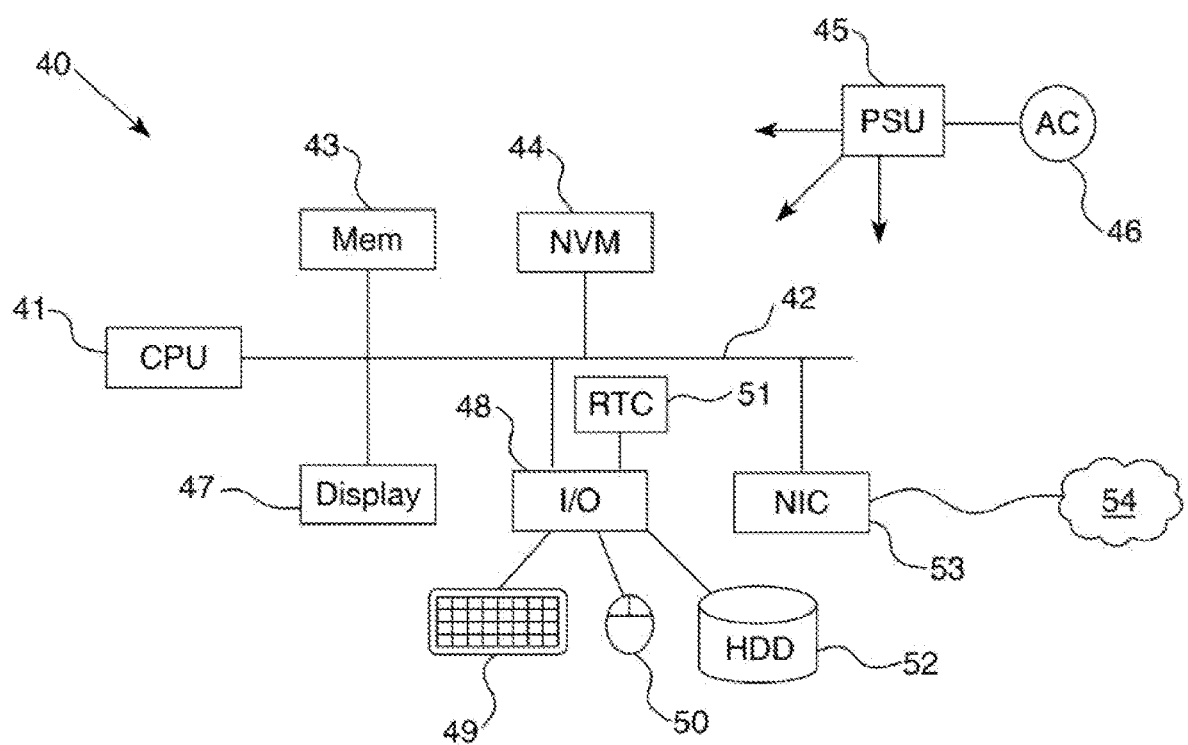
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Graphical User Interfaces

FIG. 8 illustrates an example display 800 with example graphical user interfaces in accordance with an exemplary embodiment of the invention. The display 800 may comprise a non-fungible token (NFT) staging area 802, an image data input module 804, an audio data input module 806, a video data input module 808, a first attribute input module 810, and a second attribute input module 812. Although multiple input modules are shown in a single screen, the input modules may appear across multiple (e.g., successive, etc.) screens.

The NFT staging area 802 may display media, data, and/or metadata associated with an NFT. The NFT staging area 802 may display image data. The NFT staging area 802 may comprise a media player to play audio and/or video associated with the NFT. Image data, audio data, and/or video data associated with the NFT may change in response to input received by the input modules of the screen 800. Changes in the NFT may be reflected in the NFT staging area 802.

The image data input module 804 may allow a user to select an image file from local storage. The image data input module 804 may allow a user to select an image file from remote storage. The image data input module 804 may allow a user to capture an image, such as with a webcam. The image data input module 804 may provide an address, such as an email address, to which a user may transmit an image file.

The audio data input module 806 may allow a user to select an audio file from local storage. The audio data input module 806 may allow a user to select an audio file from remote storage. The audio data input module 806 may allow a user to capture audio, such as with a microphone. The audio data input module 806 may provide an address, such as an email address, to which a user may transmit an audio file.

The video data input module 808 may allow a user to select a video file from local storage. The video data input module 808 may allow a user to select a video file from remote storage. The video data input module 808 may allow a user to capture video, such as with a webcam. The video data input module 808 may provide an address, such as an email address, to which a user may transmit a video file.

The first attribute input module 810 may allow a user to alter one or more attributes associated with one or more of image data, audio data, and/or video data. For example, the first attribute input module 810 may alter pixels in image and/or video data, such as applying a filter to image and/or video data. As another example, the first attribute input module 810 may alter audio features of audio data, such as pitch, wavelength, amplitude, frequency, etc.

The second attribute input module 812 may allow a user to alter one or more attributes associated with one or more of image data, audio data, and/or video data. For example, the second attribute input module 812 may alter pixels in image and/or video data, such as applying a filter to image and/or video data. As another example, the second attribute input module 812 may alter audio features of audio data, such as pitch, wavelength, amplitude, frequency, etc.

On creation of the NFT, the display 800 may show a new input module. The new input module may allow a user to alter metadata associated with the NFT. The new input module may allow a creator of an NFT to alter metadata associated with the NFT even after ownership of the NFT has transferred to another user.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating a digital file that is tokenized as a non-fungible token for storage on a distributed ledger system through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented system for generating a digital file that is tokenized as a non-fungible token for storage on a distributed ledger system, the computer implemented system comprising:
    a graphical user interface operable to receive, from a user, a plurality of customizations associated with a digital object, the graphical user interface comprising:
        a first graphical user interface for receiving first image data;
        a second graphical user interface for receiving first audio data;
        a third graphical user interface for receiving first video data;
        a fourth graphical user interface for receiving a first attribute input, the first attribute input corresponding to at least one of image data, audio data, and video data;
        a fifth graphical user interface for receiving a second attribute input, the second attribute input corresponding to at least one of image data, audio data, and video data;
        a sixth graphical user interface operable to enable a user to update metadata associated with a non-fungible token (NFT);
    a digital file generated by applying a set of rules or artificial intelligence logic to combine first image data, the first audio data, first video data, digital data associated with the first attribute input, and digital data associated with the second attribute input, the digital file being generated in real time and configured to simultaneously incorporate the plurality of customizations, wherein the metadata includes at least content in the generated digital file and a description of the content in the generated digital file;
    wherein the graphical user interface is further operable to receive iterative changes to one or more of the plurality of customizations, and wherein the digital file is updated in real time in response to the iterative changes; and
    a non-fungible token (NFT) generated by a tokenization process by storing a unit of data associated with the digital file on a distributed ledger system, wherein the NFT is associated with the generated digital file.

2. The computer implemented system according to claim 1, wherein the NFT is encoded with the metadata.

3. The computer implemented system according to claim 1, wherein the metadata is pointed to by a cryptographically uniform resource identifier that is referenced by the NFT.

4. The computer implemented system according to claim 1, wherein the first user is a creator of the digital file.

5. The computer implemented system according to claim 1, wherein the first user is enabled, via the sixth graphical user interface, to update the metadata regardless of whether the first user is an owner of the NFT.

6. The computer implemented system according to claim 1, wherein at least one of the first image data, the first audio data, and the first video data is created by artificial intelligence (AI).

7. The computer implemented system according to claim 1, wherein at least two of the first image data, the first audio data, and the first video data are created by artificial intelligence (AI), and wherein the artificial intelligence is further operable to generate the digital file by combining the plurality of customizations.

8. A computing implemented method for generating a digital file, comprising:
   providing a graphical user interface operable to receive, from a user, a plurality of customizations associated with a digital object, the graphical user interface comprising:
      a first graphical user interface for receiving first image data;
      a second graphical user interface for receiving first audio data;
      a third graphical user interface for receiving first video data;
      a fourth graphical user interface for receiving a first attribute input, the first attribute input corresponding to at least one of image data, audio data, and video data:
      a fifth graphical user interface for receiving a second attribute input, the second attribute input corresponding to at least one of image data, audio data, and video data;
      a sixth graphical user interface operable to enable a user to update metadata associated with a non-fungible token (NFT);
   generating a digital file by applying a set of rules or artificial intelligence logic to combine first image data, the first audio data, first video data, digital data associated with the first attribute input, and digital data associated with the second attribute input, the digital file being generated in real time and configured to simultaneously incorporate the plurality of customizations;
   wherein the graphical user interface is further operable to receive iterative changes to one or more of the plurality of customizations, and the digital file is updated in real time in response to the iterative changes; and
   tokenizing the generated digital file by storing a unit of data associated with the digital file on a distributed ledger system, wherein tokenization generates the NFT associated with the generated digital file; and
   encoding the NFT with metadata, wherein the metadata includes at least content in the generated digital file and a description of the content in the generated digital file.

9. The computing implemented method according to claim 8, wherein the metadata is pointed to by a cryptographically uniform resource identifier that is referenced by the NFT.

10. The computing implemented method according to claim 8, wherein the first user is a creator of the digital file.

11. The computing implemented method according to claim 8, wherein the first user is enabled, via the sixth graphical user interface, to update the metadata regardless of whether the first user is the owner of the NFT.

12. The computing implemented method according to claim 8, wherein at least one of the first image data, the first audio data, and the first video data is created by artificial intelligence (AI).

13. The computing implemented method according to claim 8, wherein at least two of the first image data, the first audio data, and the first video data are created by artificial intelligence (AI).

14. A computer readable medium comprising instructions that when executed by a processor enable the processor to:
   providing a graphical user interface operable to receive, from a user, a plurality of customizations associated with a digital object, the graphical user interface comprising:
      a first graphical user interface for receiving first image data;
      a second graphical user interface for receiving first audio data;
      a third graphical user interface for receiving first video data;
      a fourth graphical user interface for receiving a first attribute input, the first attribute input corresponding to at least one of image data, audio data, and video data:
      a fifth graphical user interface for receiving a second attribute input, the second attribute input corresponding to at least one of image data, audio data, and video data;
      a sixth graphical user interface operable to enable a user to update metadata associated with a non-fungible token (NFT);
   generate a digital file by applying a set of rules or artificial intelligence logic to combine first image data, the first audio data, first video data, digital data associated with the first attribute input, and digital data associated with the second attribute input, the digital file being generated in real time and configured to simultaneously incorporate the plurality of customizations;
   wherein the graphical user interface is further operable to receive iterative changes to one or more of the plurality of customizations, and the digital file is updated in real time in response to the iterative changes; and
   tokenize the generated digital file by storing a unit of data associated with the digital file on a distributed ledger system, wherein tokenization generates the NFT associated with the generated digital file; and
   encode the NFT with metadata, wherein the metadata includes at least content in the generated digital file and a description of the content in the generated digital file.

15. The computer readable medium according to claim 14, wherein the metadata comprises at least content in the generated digital file and a description of the content in the generated digital file.

16. The computer readable medium according to claim 14, wherein the metadata is pointed to by a cryptographically uniform resource identifier that is referenced by the NFT.

17. The computer readable medium according to claim 14, wherein at least one of the first image data, the first audio data, and the first video data is created by artificial intelligence (AI).

18. The computer readable medium according to claim 14, wherein at least two of the first image data, the first audio data, and the first video data are created by artificial intelligence (AI).

* * * * *